March 17, 1931.   J. W. EMERICK ET AL   1,796,889
EXCAVATING MACHINE
Filed Nov. 26, 1928   2 Sheets-Sheet 1
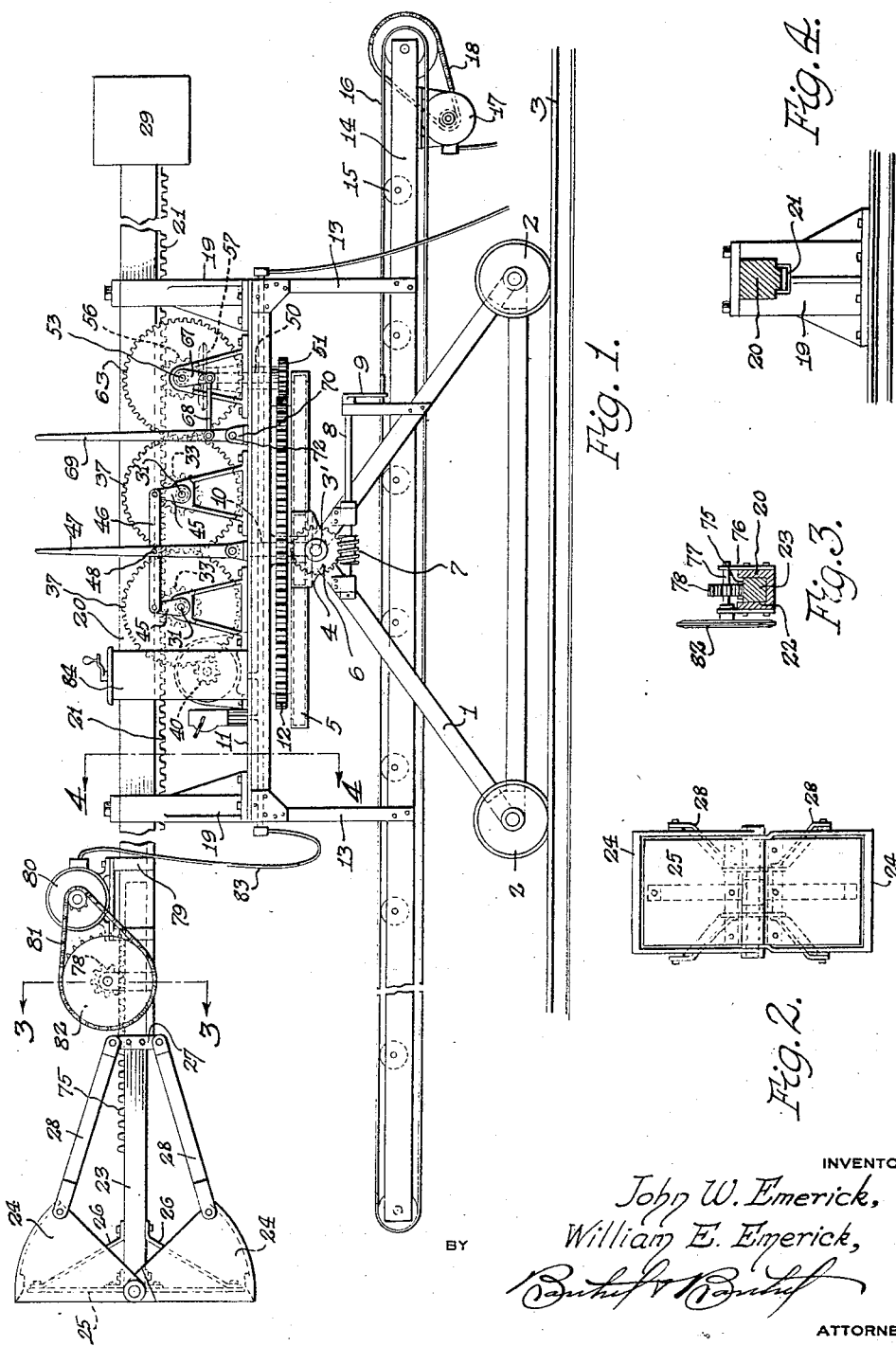
INVENTOR
John W. Emerick,
William E. Emerick,
BY
ATTORNEYS

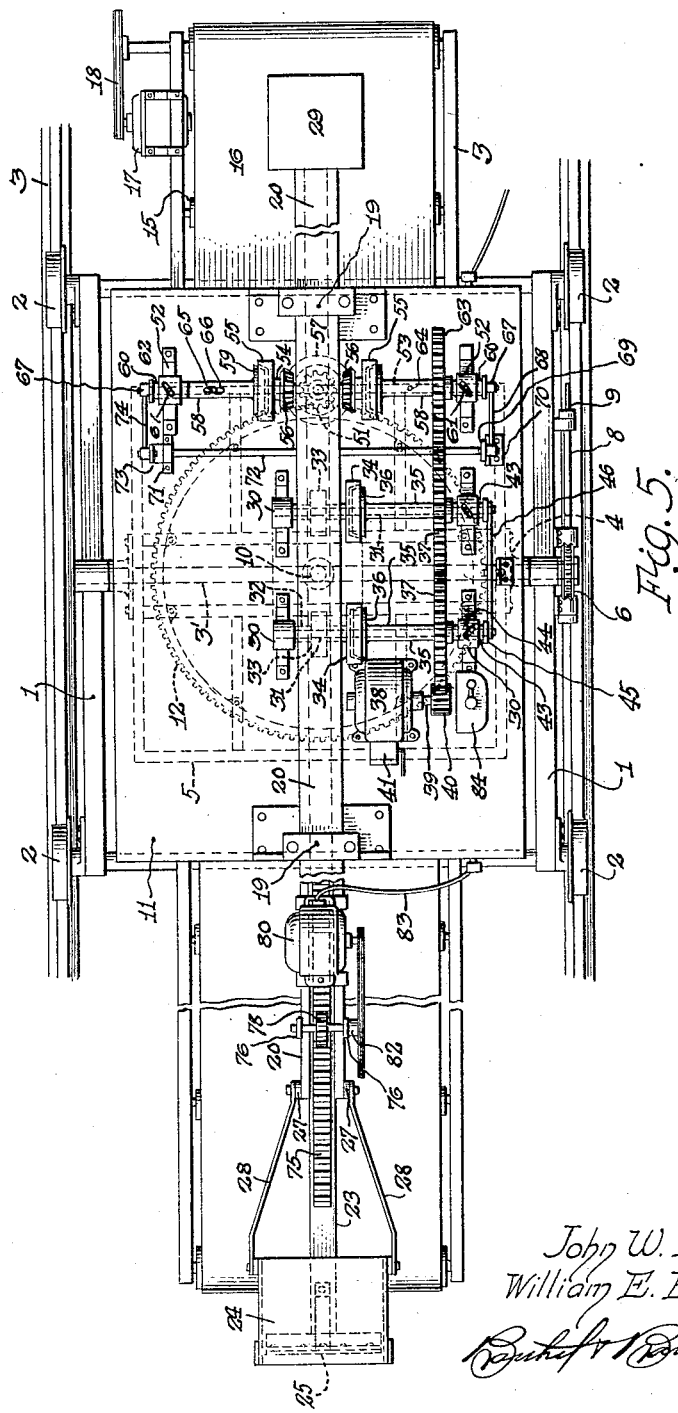

Patented Mar. 17, 1931

1,796,889

UNITED STATES PATENT OFFICE

JOHN W. EMERICK AND WILLIAM E. EMERICK, OF HALFWAY, MICHIGAN

EXCAVATING MACHINE

Application filed November 26, 1928. Serial No. 321,889.

The present invention pertains to a novel mechanically operated excavating device, and the principal object is to provide a construction of this character embodying the advantages of portability, reach, control and simple construction.

The device consists essentially of a truck on which are mounted a base member and a platform in such a manner as to permit the latter to turn in a horizontal plane and tilt at a vertical plane under control. The platform supports a slidable rack bar and operating gear therefor, the rack bar in return carrying the bucket or shovel. The aforesaid gearing is such that the bar and shovel may be slid in either direction, and the control members for this operation as well as for the various other movements of the device are located within convenient reach of the operator.

The invention is fully disclosed by way of example in the following description and in the accompanying drawings, in which—

Figure 1 is a side elevation of the machine;

Fig. 2 is a front end view of the bucket;

Fig. 3 is a section on the line 3—3 of Fig. 1;

Fig. 4 is a section on the line 4—4 of Fig. 1; and

Fig. 5 is a plan view.

Reference to these views will now be had by use of like characters which are employed to designate corresponding parts throughout.

In Fig. 1 the device is shown as including a truck comprising a pair of triangular frames 1 supported on wheels 2 adapted to ride on a track 3. The tops of the frames 1 support a rotatable transverse shaft 3' having brackets 4 fixed to the ends thereof. The brackets carry a base member 5 and one end of the shaft is further equipped with a worm gear 6 meshing with a worm 7 journalled on the adjacent frame 1 and having an extended shaft 8 equipped with an operating crank 9. By means of this mechanism, the base member 5 and parts carried thereby may be tilted vertically as will presently appear.

A stub shaft 10 journalled vertically in the center of the fixed member 5 supports a main platform 11 which is nearly as wide as the space betwen the side frames 1, as shown in Fig. 5. The shaft carries a rather large ring gear 12 for a purpose which will presently appear. Legs 13 hang from the platform and carry a pair of longitudinal bars 14 between which are journalled rollers 15. An endless apron 16 is trained over the rollers to complete a conveyor which is driven by a motor 17 geared as at 18 to one of the rollers.

The platform also carries a pair of posts 19 at the intermediate points of the transverse edges thereof. In these posts is slidably mounted a bar 20 having rack teeth 21 on the lower edge thereof. The forward portion of the bar is channelled at 22 to receive a carrier bar 23 slidable therein. To the forward end of the bar 23 are pivotally mounted the scoops 24 of a bucket or shovel. Scraper members 25 are fixed to the forward end of the bar 23 for scraping the walls of the scoops as the latter turn on their pivot. The scrapers are longitudinally supported by braces 26 as clearly shown in Figs. 1 and 2. The scoops 24 are moreover joined to straps 27 on the bar 20 by means of links 28. The remaining end of the rack bar 20 carries a counter-balance weight 29.

On the platform 11 are mounted two pairs of upright bearings 30 which support a pair of parallel shafts 31. These shafts carry like gear and clutch mechanism, and only one set, therefore, need be described in detail. Directly beneath the rack bar 20, each shaft carries a loose sleeve 32 with a pinion 33 thereon meshing with the rack 21. One end of the sleeve is equipped with the cup 34 of a cone clutch member. Adjacent the sleeve 32 is a larger sleeve 35 carrying the cone 36 of the clutch member and adapted to cooperate with the cup 34. The other end of the sleeve 35 carries a gear 37, and the two gears are interengaged with each other, so that they will turn the corresponding pinions 33 in opposite directions when the clutches are engaged. The gears, however, are driven from a motor 38 mounted on the platform and having on its shaft 39 a pinion 40 meshing with one of the gears 37. This motor is controlled from a switch box 41 adjacent thereto.

The bearings 30 adjacent the edge of the base 11 are slotted obliquely and oppositely as indicated by the numeral 42. In each of these bearings is mounted a short sleeve 43 on the shaft 31, and from this sleeve projects a pin 44 into the slot. Each short sleeve is fixed to a crank arm 45 as shown more clearly in Fig. 1, and the two arms are joined by a link 46. An operating lever 47 is fulcrumed on the platform and has an intermediate point 48 attached to the link 46. It will be apparent now that movement of the lever will engage one or the other of the clutches and disengage the other clutch, and inasmuch as the other clutch is controlled opposite the turning pinions 33, the direction of the bar 20 is thus governed.

This clutch mechanism, as well as other clutch mechanisms presently to be described, are shown merely for the purpose of illustration; and it will be understood that the invention contemplates the use of any particular style of clutch that may be desired.

The platform supports a vertical stub shaft 50 on the lower end of which is secured a pinion 51 meshing with the ring gear 12. When this shaft and pinion are turned by the mechanism presently to be described, the platform 11 and bucket mechanism supported thereby are turned in a vertical plane to the extent permitted by the spacing of the frames 1 from the longitudinal edges of the platform.

On the platform is mounted another pair of upright bearings 52 at opposite sides of the bar 20 for supporting a shaft 53. The shaft is surrounded by two short sleeves 54 each carrying at one end the cup 55 of a cone clutch and at the other end a beveled pinion 56 resting on a beveled pinion 57 carried by the vertical stub shaft 50. Adjacent the sleeves 54, the shaft is surrounded by other sleeves 58 carrying the cones 59 of the clutches.

As in the instance already described, each of the upright bearings 52 contains a short sleeve 60 surrounding the shaft 53 and having a pin 61 entering an oblique slot in the bearing. These slots are parallel. One of the sleeves 58 carries a gear 63 meshing with one of the gears 37 and is pinned to the shaft at 64. The other sleeve 58 has a slot 65 receiving a pin 66 extended from the shaft. The short sleeves 60 have cranks 67, one of which is joined by a link 68 to a lever 69 pivoted to a lug 70 on the platform. Adjacent the other crank 67 is a similar lug 71 mounted on the platform, and the pivotal support for the lever consists of a rod 72 journalled in the lugs and having the lever fixed thereto. The rod 72 carries an arm 73 adjacent the lug 71, and this arm is connected to the remaining crank 67 by a link 74 similar to the link 68.

Movement of the levers 69 slides one of the cones into the corresponding cup and permits the other clutch to work loose, so that one of the beveled gears 56 is positively turned. Inasmuch as these pinions are geared to turn in opposite directions, the direction of rotation of the stub shaft 50 and hence the platform 11 is determined by the operation of the clutch mechanism.

The carrier bar 23 is slidable independently of the rack bar 20, and is formed with rack teeth 75 on its upper edge. The channel portion 22 of the bar 20 carries a pair of short bearings 76 in which is journalled a shaft 77 disposed over the rack teeth 75 and carrying a pinion 78 meshing with these teeth. A bracket 79 is also secured to the forward portion of the bar 20 for the purpose of supporting a motor 80 geared by a drive 81 to a sprocket 82 on the shaft 77. The conductor 83 for supplying the current to the motor extends to a controller 84 mounted on the platform in close proximity to the levers 44 and 69.

In the operation of the device, the motor 38 may be permitted to turn constantly, inasmuch as it is ineffective on the pinions 33 and 51 unless the clutches are set. It will be apparent that the rack bar 20 and hence the bucket is moved towards or away from the material by turning the lever 47 to operate one or the other of the clutches 34—36. The lateral and vertical adjustment of the bucket is made by tilting the platform through the crank 9 and associated gearing and by turning the platform in a horizontal plane through the gears 12 and 51 in the manner stated. The scoops 24 are caused to bite by operating the motor 80 from the controller 84 to retract the carrier bar 23, whereupon the links 28 cause the scoops to close. To compensate for this retraction of the scoops, the rack bar 20 is caused to move forwardly. As the scoops are drawn to open position by reverse operation of the bar 23, they are emptied by means of the stationary scrapers 25. The bucket discharges upon the conveyor belt 16 by which the material is carried to a cart or truck. It will be seen that the controller 84 and the clutch levers 47 and 69 are so positioned as to be within convenient reach of an operator standing between the controller and levers.

Although a specific embodiment of the present invention has been illustrated and described, it will be understood that various alterations in the details of construction may be made without departing from the scope of the invention as indicated by the appended claims.

What we claim is:—

1. In an excavating machine, a truck, a platform mounted thereon, a rack bar slidably mounted on said platform, a bucket supported by said bar, a pair of pinions meshing with said bar and geared to turn in opposite directions, and a pair of clutches for selectively driving said pinions.

2. In an excavating machine, a truck, a base mounted thereon, a platform mounted over said base and rotatable relatively to said truck, a ring gear fixed to said base, a rack bar slidably mounted on said platform, a series of three pinions mounted on said platform and geared together to turn successively in reverse directions, said pinions being in mesh with said rack bar, means for driving said pinions, clutch mechanism for selectively operating one or the other of two of said pinions, means for driving the remaining pinion in reverse directions, clutch mechanism controlling the direction of said remaining pinion, and gearing between said remaining pinion and said ring gear.

3. In an excavating machine, a truck, a platform mounted thereon, a rack bar slidably supported on said platform, a carrier bar slidable along said rack bar, means for driving said carrier bar, a bucket including a pair of scoops pivoted on said carrier bar and linked to said rack bar, and scraper blades fixed on said carrier bar and disposed in said scoops.

In testimony whereof we affix our signatures.

JOHN W. EMERICK.
WILLIAM E. EMERICK.